United States Patent
Low

(10) Patent No.: US 7,804,519 B2
(45) Date of Patent: Sep. 28, 2010

(54) METHOD OF REFINING A PLURALITY OF TRACKS

(75) Inventor: Colin Andrew Low, Wotton-Under-Edge (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1413 days.

(21) Appl. No.: 11/227,955

(22) Filed: Sep. 15, 2005

(65) Prior Publication Data
US 2006/0062548 A1 Mar. 23, 2006

(30) Foreign Application Priority Data
Sep. 18, 2004 (GB) .................. 0420782.5

(51) Int. Cl.
H04N 5/30 (2006.01)
G06K 9/00 (2006.01)

(52) U.S. Cl. .................. 348/143; 382/117; 382/118

(58) Field of Classification Search ................ 358/143, 358/144, 161, 169, 400, 50, 484, 483; 707/103, 707/4; 342/95; 725/38; 382/103, 209, 276, 382/277, 289, 291, 293, 294, 295, 305, 283, 382/115, 107, 190, 116, 117, 118; 345/629; 348/143, 151, 155, 161, 169, 208.99, 159, 348/36, 240.99, 699; 709/227, 215, 203, 709/315; 713/186, 202, 320, 201, 200; 340/506
See application file for complete search history.

(56) References Cited

U.S. PATENT DOCUMENTS

| | | | |
|---|---|---|---|
| 4,750,123 A | 6/1988 | Christian | |
| 5,173,706 A * | 12/1992 | Urkowitz | 342/99 |
| 5,657,251 A | 8/1997 | Fiala | |
| 5,959,667 A | 9/1999 | Maeng | |
| 7,003,136 B1 * | 2/2006 | Harville | 382/103 |
| 2002/0008424 A1 | 1/2002 | Kanazawa et al. | |
| 2002/0008431 A1 | 1/2002 | Obara et al. | |
| 2002/0008618 A1 | 1/2002 | Pagano et al. | |
| 2003/0179294 A1 | 9/2003 | Martins | |
| 2005/0104959 A1 * | 5/2005 | Han et al. | 348/143 |
| 2006/0244866 A1 * | 11/2006 | Kishida | 348/699 |
| 2007/0196020 A1 * | 8/2007 | Fasulo | 382/225 |

(Continued)

FOREIGN PATENT DOCUMENTS

EP 0 714 081 5/1996

(Continued)

OTHER PUBLICATIONS

G.D. Finlayson, B. Schiele, & J. Crowley; "Comprehensive Colour Image Normalization;" The Color & Imaging Institute; pp. 1-16, Sep. 2005.

(Continued)

*Primary Examiner*—Jerome Grant, II

(57) ABSTRACT

One embodiment of a method of refining a plurality of primary tracks of a plurality of targets can be broadly summarized by the following steps: receiving a plurality of primary tracks, wherein each primary track includes ordered sequences of observation events having similarities in their visual signatures; dividing the primary tracks into separate refinement packages; allocating the refinement packages to different ones of a plurality of processors; and receiving one or more refined tracks from the plurality of processors. Other methods and systems are also provided.

10 Claims, 8 Drawing Sheets

U.S. PATENT DOCUMENTS

| | | | |
|---|---|---|---|
| 2008/0226127 A1* | 9/2008 | Brodsky et al. | 382/103 |
| 2008/0263592 A1* | 10/2008 | Kimber et al. | 725/38 |
| 2009/0231183 A1* | 9/2009 | Nettleton et al. | 342/95 |
| 2010/0002071 A1* | 1/2010 | Ahiska | 348/36 |
| 2010/0002082 A1* | 1/2010 | Buehler et al. | 348/159 |
| 2010/0053347 A1* | 3/2010 | Agarwala et al. | 348/208.99 |

FOREIGN PATENT DOCUMENTS

| | | |
|---|---|---|
| EP | 0 847 201 | 6/1998 |
| EP | 1 175 104 | 1/2002 |
| GB | 2 371 936 | 8/2002 |
| JP | 2000-069346 | 3/2000 |
| JP | 2008-259161 | * 10/2008 |
| WO | WO 00/08856 | 2/2000 |

OTHER PUBLICATIONS

A.K. Jain, M.N. Murty, & P.J. Flynn; "Data Clustering: A Review;" ACM Computing Surveys, vol. 31, No. 3, Sep. 1999; pp. 264-323.

"Research Overview: Stochastic Models for Video Analysis;" pp. 1-2; http://www.cs.rpi.edu/kettnv/Research.htm, Sep. 2005.

D. Bertsekas & D.A. Castanon; "Paralled Asynchronous Hungarian Methods for the Assignment Problem;" Department of Electrical Engineering and Computer Science, M.I.T.; pp. 1-25, Dec. 1989.

T.B. Moeslund & E. Granum; "A Survey of Computer Vision-Based Human Motion Capture;" Computer Vision and Image Understanding 81; pp. 231-268, Sep. 2000.

J. Krumm, S. Harris, B. Meyers, B. Brummit, M. Hale, S. Shafer; "Multi-Camera Multi-Person Tracking for EasyLIving;" Third IEEE International Workshop, Jul. 2000; pp. 1478-1497.

C.R.Wren, A. Azarbayejani, T. Darrell, A.P. Pentland; "Pfinder: Real-Time Tracking of the Human Body;" IEEE Transactions on Pattern Analysis, vol. 19, Jul. 1997; pp. 780-785.

"While You Were Sleeping . . . Surveillance Technologies Arrived;" pp. 1-9; http://www.anu.edu.au/people/Roger.Clarke/DV/AQ2001.html, Feb. 2001.

M. Storring, H.J. Andersen, & E. Granum; "Skin Colour Detection Under Changing Lighting Conditions;" 7th Symposium on Intelligent Robotics Systems, Jul. 1999; pp. 1-9.

W. Wolf, B. Ozer, & T. Lu; "Smart Cameras as Embedded Systems;" IEEE, Sep. 2002; pp. 48-53.

G.D. Finlayson, B. Schiele, & J.L. Crowley; "Using Colour for Image Indexing;" The Callenge of Image Retrieval, Newcastle upon Tyne, 1998; pp. 1-7, Dec. 1998.

R. Needham & M.D. Schroeder; "Using Encryption for Authentication on Large Networks of Computers;" Communications of the ACM, vol. 12, No. 28, Dec. 1998; pp. 993-998.

D. Gries & J. Misra; "A Linear Sieve Algorithm for Finding Prime Numbers;" Communications of the ACM, vol. 21, No. 12, Dec. 1978; pp. 999-1019.

V. Kettnaker & R. Zabih; "Bayesian Multi-Camera Surveillance;" IEEE, 1999; pp. 1-7, Dec. 1999.

* cited by examiner

| Signature Uniqueness | Track Purity % |
|---|---|
| 0.95 | 1.38879E-09 |
| 0.96 | 2.06115E-07 |
| 0.97 | 3.05902E-05 |
| 0.98 | 0.004539993 |
| 0.99 | 0.6737947 |
| 0.995 | 8.208499862 |
| 0.999 | 60.65306597 |
| 0.9995 | 77.88007831 | ns
METHOD OF REFINING A PLURALITY OF TRACKS

CLAIM TO PRIORITY

This application claims priority to copending United Kingdom utility application entitled, "Method of Refining a Plurality of Tracks," having serial no. GB 0420782.5, filed Sep. 18, 2004, which is entirely incorporated herein by reference.

CROSS-REFERENCE TO RELATED APPLICATION

This application is related to copending U.S utility patent application entitled "Method of Producing a Transit Graph," filed on the same date as the present application and accorded Ser. No. 11/226,953, which is entirely incorporated herein by reference, and "Visual Sensing for Large-Scale Tracking," filed on the same date as the present application and accorded Ser. No. 11/227,024, which is entirely incorporated herein by reference.

TECHNICAL FIELD

This disclosure relates to a method and apparatus for refining a plurality of tracks.

BACKGROUND

Surveillance is not a new phenomenon—people have always paid close attention to strangers and unusual activities—but the increasing anonymity, mobility and scale of urban societies means that cameras are now taking on a role that was traditionally filled by people.

Many people experience a feeling of deep unease about visual surveillance of public spaces. The social critic David Lyon has drawn comparisons with Orwell's 1984 and with Jeremy Bentham's Panopticon, a prison concept where the inmates are constantly exposed to the gaze of unseen observers. Michel Foucault has observed that society is becoming increasingly panoptic, with all our social actions exposed to many different kinds of invisible monitoring.

Despite our unease with surveillance, cameras now pervade the public sphere. The United Kingdom leads the world in this respect. Large parts of the road network are instrumented to detect speeding and traffic light violations. ATM machines gaze back at us. Town centres are routinely monitored by camera networks. Shops, lobbies, foyers, doorways, carparks, shopping arcades—a person can expect to appear on camera dozens of times each day.

Accompanying our feelings of unease is a contradictory, sometimes exhibitionist ambivalence: "reality television" programs exploit intrusive surveillance for popular entertainment. Members of the public are willing to expose the intimate details of their private lives using web casting We cannot expect a diminution in the extent of what Paul Virilio calls "The Vision Machine". There are many threats to social order, and ubiquitous and unblinking gaze of the vision machine does have a useful social role.

SUMMARY

Briefly described, in architecture, one embodiment of a system for refining a plurality of primary tracks of a plurality of targets comprises a track refinement coordinator process means operable to receive a plurality of primary track data, wherein the primary track data includes ordered sequences of observation events having similarities in their visual signatures; and a plurality of track refinement worker process means operable to perform a track refinement process, wherein the plurality of track refinement worker process means operable to work in parallel to refine a plurality of primary tracks substantially simultaneously.

Embodiments of the present disclosure can also be viewed as providing methods of refining a plurality of primary tracks of a plurality of targets. In this regard, one embodiment of such a method, among others, can be broadly summarized by the following steps: receiving a plurality of primary tracks, wherein each primary track includes ordered sequences of observation events having similarities in their visual signatures; dividing the primary tracks into separate refinement packages; allocating the refinement packages to different ones of a plurality of processors; and receiving one or more refined tracks from the plurality of processors.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

For a better understanding of the present disclosure and to show how the same may be brought into effect, specific embodiments will now be described, by way of example, with reference to the accompanying drawings, in which.

DETAILED DESCRIPTION

Figure 1:
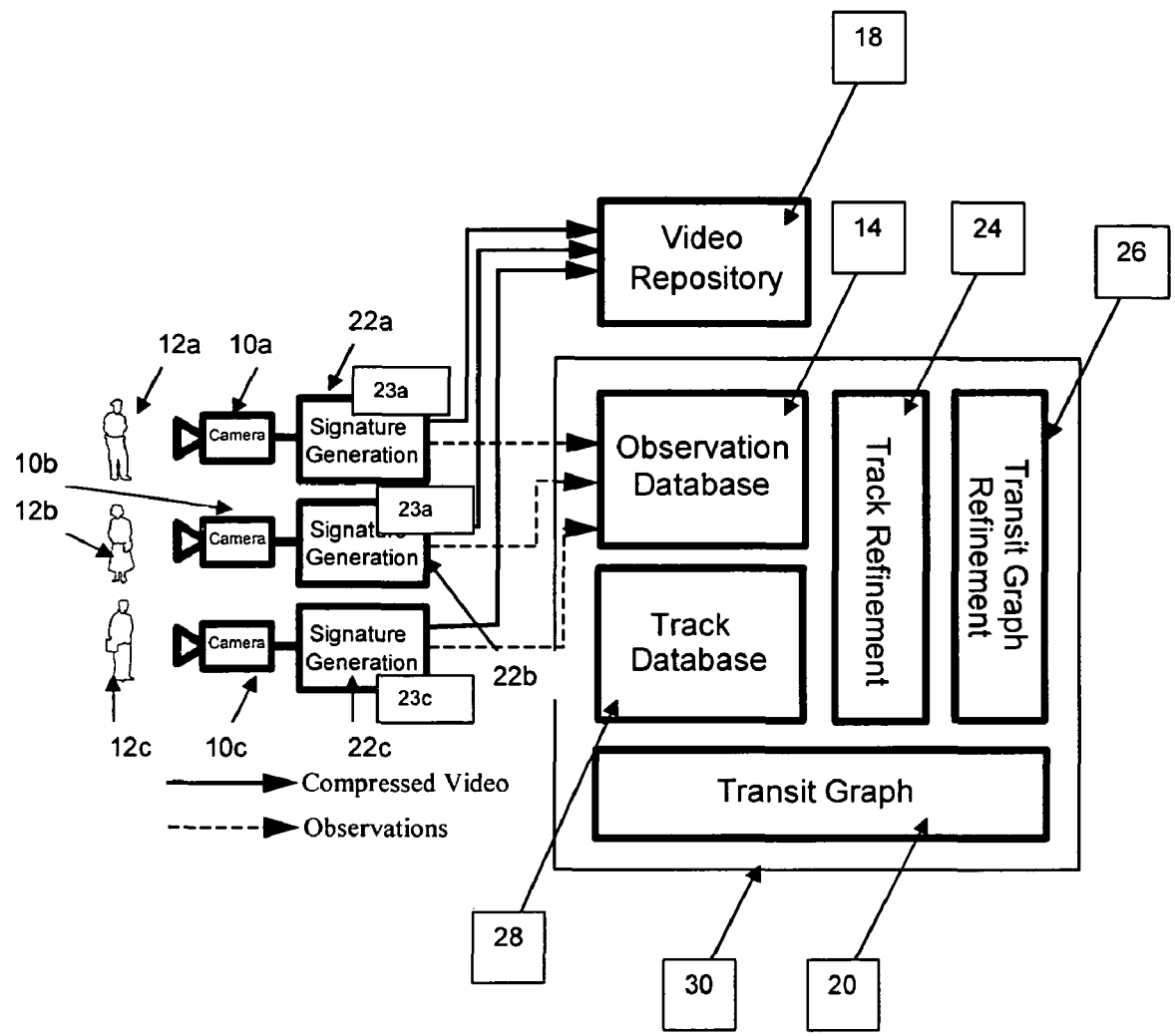
FIG. 1 is a schematic diagram of an embodiment of a system for tracking targets.

This document describes how a large-scale network of cameras can be used to track the movements of pedestrians through a public space such as a city centre, or a mass transit system such as an underground railway, or a large air terminal. It does this without identifying individuals, relying on simpler, faster, and more robust methods. It could be used to track the movements of a mugger, enabling an interception, or to carry out post-event analysis of a crime.

Camera tapes are already used to reconstruct the movements of people during the interval of time surrounding a serious crime, and several high-profile investigations in the UK have made heavy use of such tapes. The effort currently required to comb through the potentially relevant video recordings is enormous. A system that could simplify the task of correlating the appearances of people across many different cameras would have some utility.

According to a first aspect of the disclosure, there is provided an embodiment of a method of refining a plurality of primary tracks of a plurality of targets, the embodiment of the method comprising: receiving a plurality of primary tracks; dividing the primary tracks into separate refinement packages; allocating the refinement packages to different ones of a plurality of processors; and receiving one or more refined tracks from the plurality of processors.

The different processors may be different computing devices, or may be different processors in a single computing device. The different processors may be different elements of single computer processor.

One embodiment of the method advantageously allows for the parallel processing of primary tracks into refined tracks. A track refinement coordinator process may receive the plurality of primary tracks, and/or may divide the primary tracks into the separate refinement packages. The primary tracks, in one embodiment, consist of ordered, which may further be temporally ordered, sequences of observation events. In one embodiment, the refinement by the processors uses a transit graph.

According to a second aspect of the disclosure, there is provided an apparatus for refining a plurality of primary tracks of a plurality of targets, the apparatus comprising: track refinement coordinator process means operable to receive a plurality of primary track data; and a plurality of track refinement worker process means operable to perform a track refinement process, wherein the plurality of track refinement worker process means operable to work in parallel to refine a plurality of primary tracks substantially simultaneously. In one embodiment, the track refinement coordinator process means are operable to update a transit graph used by the plurality of track refinement worker process means.

According to a third aspect of the present disclosure, one embodiment of a method of tracking a plurality of targets comprises: capturing a plurality of images of a plurality of targets with a plurality of image capture devices; generating a target observation for each target, the target observation including at least a visual signature of the target and a time value; partitioning target observations according to similarities in their visual signatures; and producing primary tracks from the partitioned target observations.

The partitioning of target observations based on visual signature values provides significant computational advantages. The partitioned target observations are likely to contain information from non-identical targets, but subsequent processing reduces that effect.

In one embodiment, the primary tracks are decomposed into refined tracks with a transit graph. The transit graph may represents a likelihood of a target moving between two specified locations, e.g., locations within a certain period of time are the locations of image capture devices. The primary tracks are advantageously decomposed using a priori information obtained from the network of image capture devices.

The a priori information may be determined by a bootstrap process, which may involve performing an embodiment of the method without the a priori information in order to produce the a priori information. The a priori information may be generated and/or the primary tracks may be refined using a subset of the target observations, the subset preferably having an above average confidence in an accuracy of one or more primary tracks for those target observations, in one embodiment.

In one embodiment, the primary and/or refined tracks are established using a confidence/probability expressed in terms of a value to be maximised. The primary and/or refined tracks are derived using an expression of the target observations in a bipartite form, which may be a bipartite graph, using weighted matching. The bipartite graphs may include expressions for the start and/or end of a track.

The use of a maximisation problem advantageously allows efficient computation. The use of a bipartite expression advantageously allows the solution to be produced in polynomial time.

In one embodiment, the target observations include, in addition to the visual signature and the time value, an image capture device identification code. The target observations may include a location of the image capture device and/or a reference code for a store in which the captured images are to be stored.

The visual signature may be a finite bit string that characterises the target. The visual signature may be produced by a colour image segemenation of a target image. The visual signature may include information relating to a shape of an identified target, including segmentation of body sections. The transit graph is preferably a matrix, in one embodiment.

The primary tracks may be produced using a priori information relating to a location of each of the image capture devices and/or interrelationships between locations of the image capture devices. The a priori information may be an average or estimated journey time between two locations or image capture devices, an average or estimated residency time at a location, and/or an indication of whether a location is typically a beginning or an end of a track.

According to a fourth aspect of the present disclosure, one embodiment of an apparatus for tracking a plurality of targets comprises: a plurality of image capture devices operable to capture a plurality of images of a plurality of targets; primary computing means operable to a) generate a target observation for each target; b) to partition target observations according to similarities in visual signatures of the target observations; and c) produce primary track estimates from the partitioned target observations. The primary computing means is a computer or a group of linked computers, in one embodiment. The image capture devices may be at locations in which the plurality of targets is to be tracked. The apparatus may include a video storage element for storing captured images. The primary computing means may incorporate an observation database. The observation database may store target observations.

Further, the primary computing means may produce target observations based on visual signatures received from the image capture devices. The image capture devices may incorporate signature generation means, which may be computing means, the signature generation means being operable to transmit visual signatures to the primary computing means. The primary computing means may incorporate a track database, for track data produced from the target observations. The primary computing means may incorporate a track refinement element. The primary computing means may incorporate a transit graph element, which transit graph incorporates a priori information, preferably relating to the image capture devices, in one embodiment. The primary computing means may incorporate a transit graph refinement element, which is operable to refine a transit graph of a priori information.

According to a fifth aspect of the disclosure, one embodiment of a method of producing a transit graph of a priori information relating to movements of a plurality of targets from a first of a plurality of locations to a second of the plurality of locations comprises: processing a plurality of target observations from a plurality of image capture devices to produce at least one primary track for at least one target; and processing the at least one primary track to determine a priori information relating to movement of a target from a first of a plurality of locations to a second of the plurality of locations.

The a priori information may relate to the transit frequency and/or transit duration of transitions between the first and second locations. The a priori information may be a matrix, preferably a probability matrix, in one embodiment. Preferably, the probabilities relate to the likelihood of a target passing from one of the plurality of locations to another of the plurality of locations and the likelihood of a target passing from one of the plurality of locations to another within a certain time period, in one embodiment.

Advantageously, the transit graph may be produced from target observations with no prior information in the transit graph. In one embodiment, the target observations include a visual signature. In a further embodiment, the visual signatures from a plurality of target observations are partitoned according to similarities in the visual signatures. The transit graph may be updated with information from subsequent target observations. In use, the transit graph may be continuously updated with new target observations.

In one embodiment, the transit graph may be produced and/or updated using a subset of the available target observations, which subset is preferably a subset with an above average level of confidence in the purity of a primary track produced from the target observations, in one embodiment. High quality track estimates are advantageously used to refine the transit graph.

According to a sixth aspect of the disclosure, a transit graph formed according to the third aspect comprises a priori information relating to movement of a target from a first of a plurality of locations to a second of a plurality of locations. According to a seventh aspect of the present disclosure, one embodiment of an apparatus for producing a transit graph of a priori information relating to movements of a plurality of targets from one of a first plurality of locations to a second of a plurality of locations comprises a plurality of image capture devices and processing means operable to process a plurality of target observations from the image capture devices to produce at least one primary track and to process the at least one primary track to produce a priori information relating to movement of a target from a first to a second location.

Aspects of the present disclosure extends to a computer programmed to perform an embodiment of the method of the first aspect and/or the method of the third aspect. Aspects of the present disclosure further extends to a computer program product incorporating a computer program operable to perform an embodiment of the method of the first aspect and/or the method of the third aspect. All of the features described herein may be combined with any of the above aspects, in any combination.

This document describes how a large-scale network of cameras can be used to track the movements of pedestrians through a public space such as a city centre, or a mass transit system such as an underground railway, or a large air terminal. It does this without identifying individuals, relying on simpler, faster and more robust methods. It could be used to track the movements of a mugger, enabling an interception, or to carry out post-event analysis of a crime.

The problem addressed by this application is to correlate observations of people across a large, spatially extended system of cameras. "Large" means the number of cameras could vary from hundreds to many thousands. "Spatially extended" means a city centre, or a mass transit system such as London Underground, or a public space such as an airport terminal. There could be hundreds of thousands of people within view of a camera. It is possible that the fields-of-view of some cameras will overlap, so that people could be tracked camera-to-camera using known techniques, but this is not assumed, and in some embodiments, fields of view will not overlap. While it is possible for the cameras to be monochrome, in some embodiments, it would be better if they were colour, and this is assumed.

A track consists of a sequence of observations of the same person made by different cameras, and one would expect the track to form a piecewise approximation to the actual physical path of a pedestrian within the spatial region monitored by the cameras. The scale of this problem is atypical for coordinated surveillance involving multiple cameras, where several cameras with overlapping fields of view monitoring a limited area such as a car park is a more typical scenario. A key step in making large-scale camera tracking possible is not to think of a camera as an observing "eye", capable of high-level visual semantic processing, but as a sensor capable of originating simple observations. The information generated by a camera is a sequence of observation events, each containing something that will be termed a visual signature, or signature.

Visual Signatures

A visual signature is a finite bitstring of some kind. The tracking problem becomes trivial if each camera in a system generates a unique signature for each unique object presented to it, and each unique object results in the same unique signature being generated by each camera. We can create tracks simply by recording the temporal sequence of observations indexed according to signature.

This is not an achievable possibility. To illustrate why, it is useful to review current progress in facial recognition, as there are general features in this problem which apply to other kinds of visual signature.

One of the most effective current techniques for facial recognition is the Principal Component Analysis (PCA) method, also called the "eigenface" method and the Kahunen-Loueve transformation. A two dimensional pixel image of a face is first normalised with respect to scale, colour, position etc., and the eigenvectors of the spatial covariance matrix are found. The eigenvectors describe a reduced-dimensionality basis space which spans the space of facial types according to the training data (facial images) used to construct the space. An arbitrary face can be characterised by giving its components in the eigenvector space.

The string composed of the numerical components in this space is an example of a visual signature—it is a finite bitstring which can be communicated from one place to another, and can be used for the purposes of comparison. For example, it can be compared with a signature stored in a database for the purpose of identifying a given person. It could be compared with the signature generated by another camera as part of a tracking system. The FaceIt system produced by Visionics Inc. produces a signature ("faceprint") of 84 bytes.

In a practical facial recognition system, a person would present themselves in front of a camera, and a door might be unlocked depending on whether the person was recognised or not. There are two possibilities: an unauthorised person might be admitted by mistake; the rate at which this happens is the false acceptance rate (FAR); and an authorised person might be denied admission—the rate at which this happens is the false rejection rate (FRR).

In practical systems, it is observed that there is a trade-off between the FAR and the FRR, so that as the FAR is decreased, the FRR increases, and vice-versa. The point at which both values are minimised is the Equal Error Rate (EER). Although an EER of less than 1% is quoted by one leading vendor of face recognition software (Visionics), it is instructive to consult one of the most authoritative studies of facial recognition systems, the Facial Recognition Vendor Test conducted in 2000 on behalf of the US DoD Counterdrug Technology Development Program Office. Under less than ideal conditions, EERs as high as 30-50% are observed in some tests.

The point is that when variability in pose, lighting, distance etc. are factored in, current facial recognition systems are less than 100% accurate, often considerably less, and some level of misidentification will occur. Reinterpreted, this means that the same person could generate different signatures from different cameras, or different people could produce the same signature.

This is a general characteristic of any kind of visual identification metric one might propose, and even though one might expect the FAR and FRR of visual identification systems to continue to improve, they are going to be significant for some time in the future. In conclusion, it is assumed that a visual signature cannot be regarded as unique, and some level of confusion will arise.

For the sake of argument, it is assumed that it is possible to generate a visual signature corresponding to each person observed by a camera. The nature of the signature is not specified at this point. It is assumed that observations of a person across different cameras will produce a range of signatures, and observations of different people could produce signatures that are similar or identical. Further requirements for signatures and some schemes for generating signatures are discussed later in the section covering Signature Generation and Classification.

Solution Architecture

The functional components in the solution architecture are shown in FIG. 1.

Cameras & Signature Generation

Images from a distributed array of cameras 10a-c are processed by signature generation means 22a-c to extract relevant targets 12a-c (i.e. people) in a signature generation process and each target observation is associated with a target signature. An observation is added to a central Observation Database 14. The signature generation means 22a-c incorporate a computing element 23a-c. Each observation contains: target signature; camera id; location; time/timecode; and Video Repository reference.

In a practical implementation, observations are communicated to the observation database 14 in the form of observation event messages, using some form of networking such as TCP/IP. Portions of the raw video from each camera 10a-c are compressed and forwarded to a Video Repository 18. The Video Repository 18 reference and observation timecode provides a way to access the raw video (and possibly some processed video) associated with each observation.

Observation Database

All observations events generated by the distributed camera system are held in an Observation Database 14.

Track Database

Figures 7, 8:
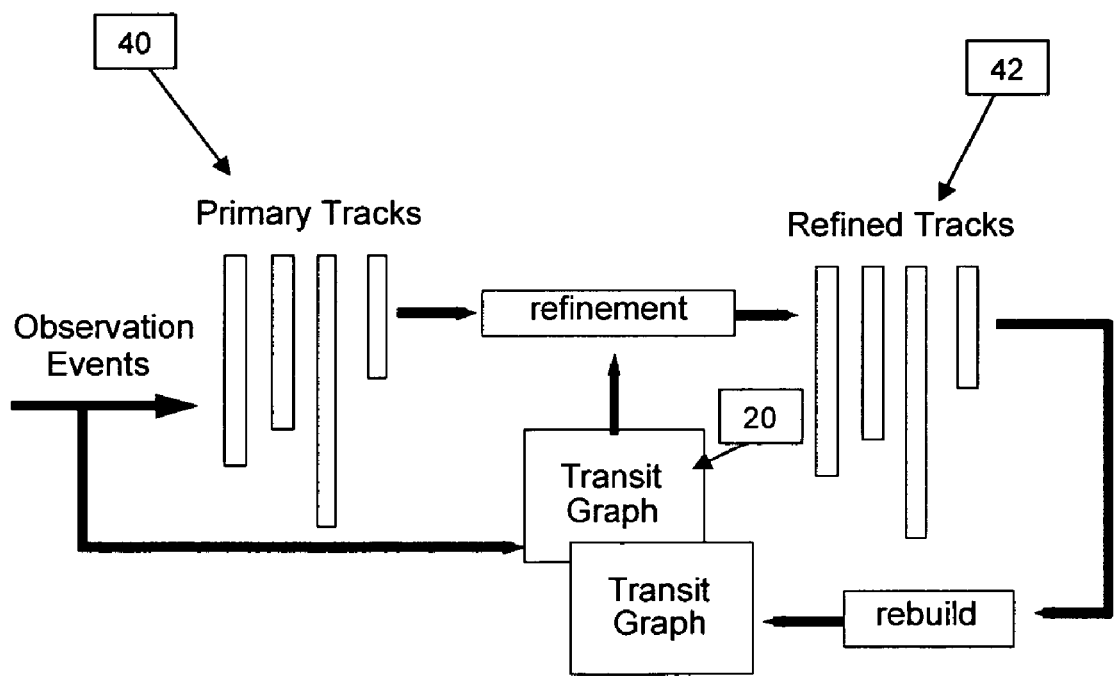
FIG. 7 is a table showing track purity against signature uniqueness.
FIG. 8 is a schematic flow diagram for the steps in producing a transit graph.

As shown in FIG. 8, observations are organised into tracks. Tracks can be primary tracks 40 and/or refined tracks 42. Observations are clustered into primary tracks 40 using signature information. Primary tracks are refined in a track refinement element 24 using information contained in a Transit Graph 20. Primary and refined tracks are stored in a track database 28. The observation database 14, transit graph 20, track refinement element 24, transit graph refinement element 26, and track database 28 may be implemented in a computer 30.

Transit Graph

Each camera 10a-c is identified using a unique integer id. If there are N cameras, the transit graph is an N×N matrix with each matrix cell containing accumulated information about the likelihood that a target which appears at camera m will appear some time later at camera n.

Although the Transit Graph 20 can be initialised using off-line observations, it can also be constructed in real time using observation data, as described in more detail later in this document.

Track & Transit Graph Refinement

Primary tracks are refined using a priori information about movements between cameras. The Transit Graph 20 is refined by a transit graph refinement element 26 using the observations in refined tracks. An embodiment of the iterative bootstrapping method used to generate the Transit Graph 20 is one of the features of the algorithm described later in this document.

Video Repository

In one embodiment, the Video Repository 18 contains raw video from each camera 10a-c indexed by camera and timecode, and each portion corresponding to an observation event is capable of being accessed remotely using a reference.

Tracking

A track consists of a sequence of observations. Given a set of observations, there are many possible ways to group the observations into tracks. The number of ways a set of N observations can be partitioned into tracks is the same as the number of partitions of a set of size N into non-empty subsets, and is given by Bell(N), where Bell(N) is the Bell number for integer N, the sequence (1, 1, 2, 5, 15, 52, 203, 877, 4140, 21147, 115975, 678570, 4213597, ... ).

Figure 2:
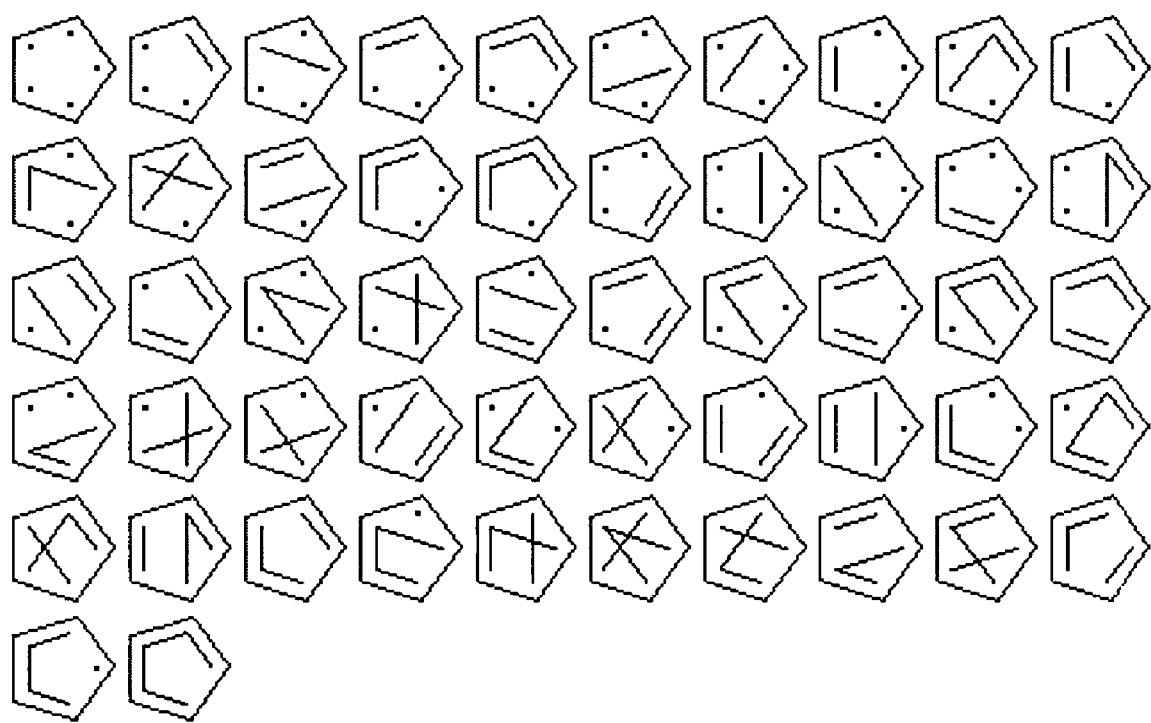
FIG. 2 is a schematic diagram of an illustrative example of the 52 partitions of a set of 5 elements.

An illustrative example of the 52 partitions of a set of 5 elements are shown in FIG. 2 below from Robert M Dickau, with his permission. The visual representation employed in FIG. 2 is highly appropriate and shows how a partition of observations can be interpreted as a set of tracks. Note that tracks must begin and end, so a single point in a set above would correspond to a track with a single observation event.

One way to group and order observations into individual tracks is to enumerate all possible partitions of a set of observations, interpret each partition as a track hypothesis, and grade each set of tracks using a priori probabilities to determine the likelihood of each hypothesis. The partition with the greatest likelihood would then be used as the best track hypothesis for that set of observations. Unfortunately the combinatorics work against this approach—after as few as 12 observations there are 4,213,597 competing hypotheses to consider. This approach ("track splitting" or "multiple hypothesis tracking") is one of the standard approaches described in the literature, but it is not well suited to situations where large numbers of observations are involved. Simulation of the problem (discussed later) routinely deals with set sizes of several hundred observations, and even when low probability hypotheses are culled with extreme prejudice, the combinatorial explosion is too severe for a practical implementation using this technique.

Given a set Z of N observations, let $\Gamma^*$ be the collection of all partitions of Z and let $\Gamma$ be a discrete random element defined on $\Gamma^*$. Then a partition $\gamma \in \Gamma$ represents a specific hypothesis about how the observations into tracks can be stated as $$\text{maximise}\{P((\Gamma=\gamma)|Z)|\gamma\in\Gamma^*\}$$

That is, given the set of observations Z, find the track hypothesis with the greatest probability. This formula can be expanded using Bayes Theorem to give $$\text{maximise}\left\{\frac{P(Z|(\Gamma=\gamma))\cdot P(\Gamma=\gamma)}{P(Z)}\,\bigg|\,\gamma\in\Gamma^*\right\}$$

where the first term in the numerator is the likelihood of the observations given a specific track hypothesis, and the second term in the numerator is prior, the a priori probability for the specific track hypothesis being true. The term in the denominator is constant across all track hypotheses and can be ignored in the maximisation procedure.

It is normal to continue the analysis by decomposing the likelihood in terms of the specifics of the actual problem. Vera Marie Kettnaker provides a highly elaborate Bayesian analysis down to the frame level of individual cameras. In practice, the underlying assumptions result in the likelihood information factoring out, so that only the prior terms remain.

The key architectural separation made in this document between signature generation and tracking exposes the intuition behind this result more clearly. Suppose that we have a set of observations that are consistent with many possible track hypotheses. The likelihood term encodes the fact that while all hypotheses are possible, some are more likely than others. If one were to exhibit a specific track hypothesis, on could say whether the observations were more or less likely given that hypothesis.

Figure 3:
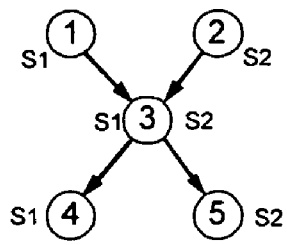
FIG. 3 is a schematic diagram of an illustrative example of track hypotheses.

Consider the situation in FIG. 3. Assume signature S1 is very different from signature S2, and the probability that S1 could be confused with S2 very small. Then, all other things being equal, one would prefer to believe that the signatures were generated by the track hypotheses (i.e. underlying object movements) 1, 3, 4 and 2, 3, 5 rather than 1, 3, 5 and 2, 3, 4. If S1 was similar to S2 (signature confusion), then both hypotheses would be viable, and we would have to depend on additional (e.g. prior) information to choose one hypothesis over the other.

Let $t_i$ be a track in the partition $\gamma \in \Gamma^*$ and let $t_i$ consist of the observations $o_1, o_2 \ldots o_n$ which in turn contain the signature values $s_1, s_2, \ldots s_n$. Then, the contribution of $t_i$ to the overall likelihood of the partition $\gamma \in \Gamma^*$ is the probability that $s_1, s_2, \ldots s_n$ are generated by the successive appearances of the same individual. If $s_1, s_2, \ldots s_n$ are identical or similar, we would be inclined to assign a high likelihood to $t_i$, but if $s_1, s_2, \ldots s_n$ are very different, then we would assign a low likelihood.

It is unclear that identifying a quantitative measure for the likelihood of $s_1, s_2, s_n$ being the successive appearances of same individual is a meaningful procedure. The difficulty is that the system in question, a large-scale visual tracking system for use in public spaces, has a non-stationary population of observed subjects. The visual appearance of subjects may be moderately constant over short periods of time (e.g. hours), but certainly not days. Each collection of observations/signatures needs to be considered as unique, and this is consistent with the underlying situation, a changing population of individuals with constantly changing appearances.

An alternative procedure to that in the preceding text is to use a signature classifier to partition a set of observations Z into subsets. Any signature that is "sufficiently like" another signature is collected into the same subset. Track hypotheses are only considered within each subset. In this way, the collection of partitions considered in the maximisation procedure is drastically reduced; it is equivalent to assigning many partitions a likelihood of zero, and the remainder a likelihood of one.

Let $Z=Z_1\cup Z_2 \ldots \cup Z_N$ where $Z_1 \ldots Z_N$ are non-empty subsets of Z generated by a signature classifier such that $Z_i \cap Z_j = \emptyset$ for all i, j. Let $\Gamma^i$ be the collection of all partitions of $Z_i$ and let $$\Gamma^+ = \Gamma^1 \cup \Gamma^2 \ldots \cup \Gamma^N$$

Then $\Gamma^+ \subset \Gamma^*$ and the likelihood can be defined as $P(Z|(\Gamma=\gamma))=1$ if $(\gamma\in\Gamma^+)$ $P(Z|(\Gamma=\gamma))=0$ if $(\gamma\in\Gamma^*-\Gamma^+)$ An advantage of this approach is that the design of a suitable signature classifier is orthogonal to the design of the tracking system. There is also a considerable computational advantage. A set of 12 observations has 4213597 partitions as potential hypothesis, but two sets of 6 observations have 406 partitions. The advantage in pre-partitioning the set Z increases as the size of the set increases.

This is the approach used in this disclosure, because of the advantages described above. Rather than try to estimate a function that yields the likelihood that a collection of signatures comes from the same observed subject, a function that will almost certainly vary for every subject, the assumption is made that signatures can be projected into a high-dimensional signature space (incorporating for example attributes of a subjects head, body and legs, possibly specified by size, shape and/or colour), and that the camera/signature generation system is well-behaved in the sense that successive appearances of the same subject produces signatures that occupy a "well-defined region" in this space (as opposed to a subject occupying a single point in this space, which would occur for a perfectly resolved subject.) It is also assumed that it is possible to devise a classifier which can divide the signature space into regions such that each region contains signatures corresponding to all the observations of a single subject. It is not the case that each region contains signatures for only one subject—if that was possible, each subject would be uniquely identified, and the tracking algorithm described below would be redundant. To implement the partitioning a suitable known clustering algorithm would be used.

These are strong assumptions, as they imply that the output from each camera can be normalised with respect to siting, scaling, lighting, environment, internal settings, and manufacturing tolerances. However, in a network consisting of hundreds or thousands of cameras, this is an important architectural separation—cameras do camera things, and tracking does tracking. We do not know in advance what people will look like, what they will wear, how they will move. The best we can do is ensure that the camera subsystem produces signatures that are localised in a metric space such that it is possible for a classifier to find well-defined clusters. This assumption is revisited in more detail in the section relating to Signature Generation and Classification below.

The prior probability $P(\Gamma=\gamma)$ can be expressed using the following definitions. Let $P_N(x,t)$: the prior probability density that a new object appears (becomes visible) in location x at time t.

$P_D(x,t)$: the prior probability density that an object disappears at location x and time t.

$P_{Select}(x, x')$: prior probability that an object at locations will select x' as a next destination.

$P_{Delay}(x, t, x', \Delta t)$: prior probability density that an object moving at time t from x to x' will reappear after a delay of $\Delta t$.

Figure 4:
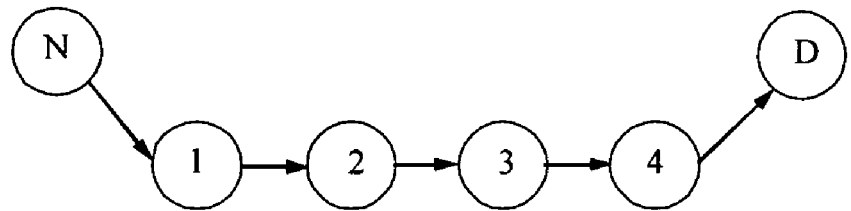
FIG. 4 is a schematic diagram of an illustrative example of a series of locations for a tracked target.

$P_M(x, t, x', t')$: the prior probability density that an object last visible at location x and time t moves to location x' and becomes visible at time t' after an interval $t'-t=\Delta t$. The situation is shown in FIG. 4.

Figure 5:
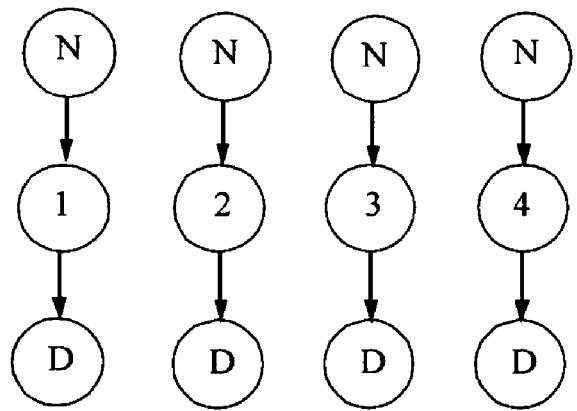
FIG. 5 is a schematic diagram of an illustrative example of an alternative series of locations to those in FIG. 4 for the same observations.

The hypothesis is that a new observed subject appears in location 1, moves through locations 2, 3 and 4, and disappears at location 4. The appearance of a new subject (from some notional location N "offstage") marks the initiation of a track, and the disappearance of the subject (to some notional location D "offstage") marks the termination of the track. An alternative hypothesis consistent with the same observations is shown in FIG. 5.

Thus we have that $$P_M(x, t, x', t') = P_{Select}(x,x') \cdot P_{Delay}(x, t, x', t'-t)$$

Note that the priors $P_{Select}$ and $P_{Delay}$ can be continuously estimated from high-confidence tracks using standard estimation techniques. Thus, some tracks with high-confidence are used to update the transit graph, because for example a track for a brightly dressed person amongst many darkly dressed people will have a higher associated confidence level.

For any hypothesised track consisting of K consecutive locations in the location graph, we can order the locations using integer numbering from 1 ... K, where an object appears in location 1 and disappears in location K. The probability of a given track hypothesis $\tau$ is $$P(\tau) = P_N(1, t_1)dt_1 \cdot \left( \prod_{x=1...K-1} P_{Select}(x, x+1) \cdot P_{Delay}(x, t_x, x+1, \Delta t_x) dt_{x+1} \right) \cdot P_D(N, t_K) dt_N$$

The probability of a partition is the product of the probabilities of each track in the partition:

$$P(\Gamma = \gamma) = \prod_\tau P(\tau) \mid \tau \in \gamma$$

$$= \prod_\tau P_D(\tau) \cdot dt_1 \cdot dt_2 \cdot dt_3 \ldots dt_N \mid \tau \in \gamma$$

where $P_D(\tau)$ is a probability density:

$$P_D(\tau) = P_N(1, t_1) \cdot \left( \prod_{x=1...N-1} P_{Select}(x, x+1) \cdot P_{Delay}(x, t_x, x+1, \Delta t_x) \right) \cdot P_D(N, t_N)$$

It is possible to factor out the differentials $dt_i$ because for any partition, each observation appears exactly once in exactly one track, and so the product will always $$G \cdot dt_1 \cdot dt_2 \cdot dt_3 \ldots dt_N W(\gamma)$$

contain $dt_1 dt_2 \ldots dt_N$ exactly once. Absolute probabilities are not required for the maximisation procedure, and we are at liberty to divide by an arbitrary scaling factor, so that the weight assigned to a partition is $$W(\gamma) = \frac{1}{G} \cdot \prod_\tau P_D(\tau) \mid \tau \in \gamma$$

Given the preceding discussion, the solution to the tracking problem can now be given as $$\text{maximise}\{P(\Gamma = \gamma) \mid \gamma \in \Gamma^+\} \equiv$$
$$\text{maximise}\{W(\gamma) \mid \gamma \in \Gamma^+\} \equiv$$
$$\text{maximise}\left\{ \sum_\tau \log P_D(\tau) \mid \tau \in \gamma, \gamma \in \Gamma^+ \right\}$$

The final step can be justified by the fact that the partition for which the product is maximised is the same partition that maximises the sum over all tracks of the logarithm of $P_D(\tau)$. Reframing the problem in terms of maximising a sum of terms is convenient because there are powerful algorithms for solving problems of this kind.

The maximisation procedure over all partitions and tracks is the heart of the tracking algorithm. Aubrey Poore previously showed how data association problems of this type can be solved as multi-dimensional assignment problems, and the solution adopted here is inspired by Kettnaker & Ramin Zabih, who approach the problem as a two-dimensional assignment using a solution to the weighted matching (assignment) problem in bipartite graphs.

A bipartite graph is a graph, which can be partitioned into two sets X and Y of vertices such that there are no edges between vertices within each set. A matching is a subset of the edges between X and Y such that each vertex is attached to only one edge. A perfect matching between two sets of equal size is a matching that connects every vertex in X to a vertex in Y and forms a one-to-one and onto mapping between the two sets. If each edge in the graph has an associated weight, then a maximum weighted matching is a perfect matching that maximises the edge weights.

An advantage of formulating the tracking problem in terms of weighted matching on a bipartite graph is that a solution can be found in polynomial time: if the cardinality of X is |X|, then solutions exist that execute in $O(|X|^3)$ time. This is a considerable improvement on Bell(|X|).

Let Z be a sequence of observations $z_1, z_2, z_3, \ldots z_N$ sorted in time-ascending order. Let X=Y=Z, so that the bipartite graph is a mapping from Z to itself. A vertex $z_i \in X$ can only have an edge connecting to a vertex $z_k \in Y$ if i<k, because observations are temporally ordered—that is, early observations must precede later observations. Let the weight associated with edge $e_{ik}$ be $$W(e_{ik}) = P_{Select}(i,k) \cdot P_{Delay}(i, t_i, k, \Delta t_i)$$

A complete matching of maximum weight on this graph will result in every $z_i \in X$ being linked to a $z_k \in Y$ such that i<k (temporal order preserved) in such a way that the overall likelihood is maximised—this is exactly what is needed to find the partition with the greatest likelihood. Unfortunately this is insufficient. The sequence of observations Z contains the interleaved tracks of several observed subjects, and each track must be initiated at some point in the sequence, and must terminate at some point in the sequence. The scheme just described provides no way for tracks to initiate or terminate; indeed, the condition i<k guarantees that no perfect matching is even possible, as there is always an observation $z_1$ which precedes all and cannot be matched, and an observation $z_N$ which has no observation following it, and it also cannot be matched.

Figure 6:
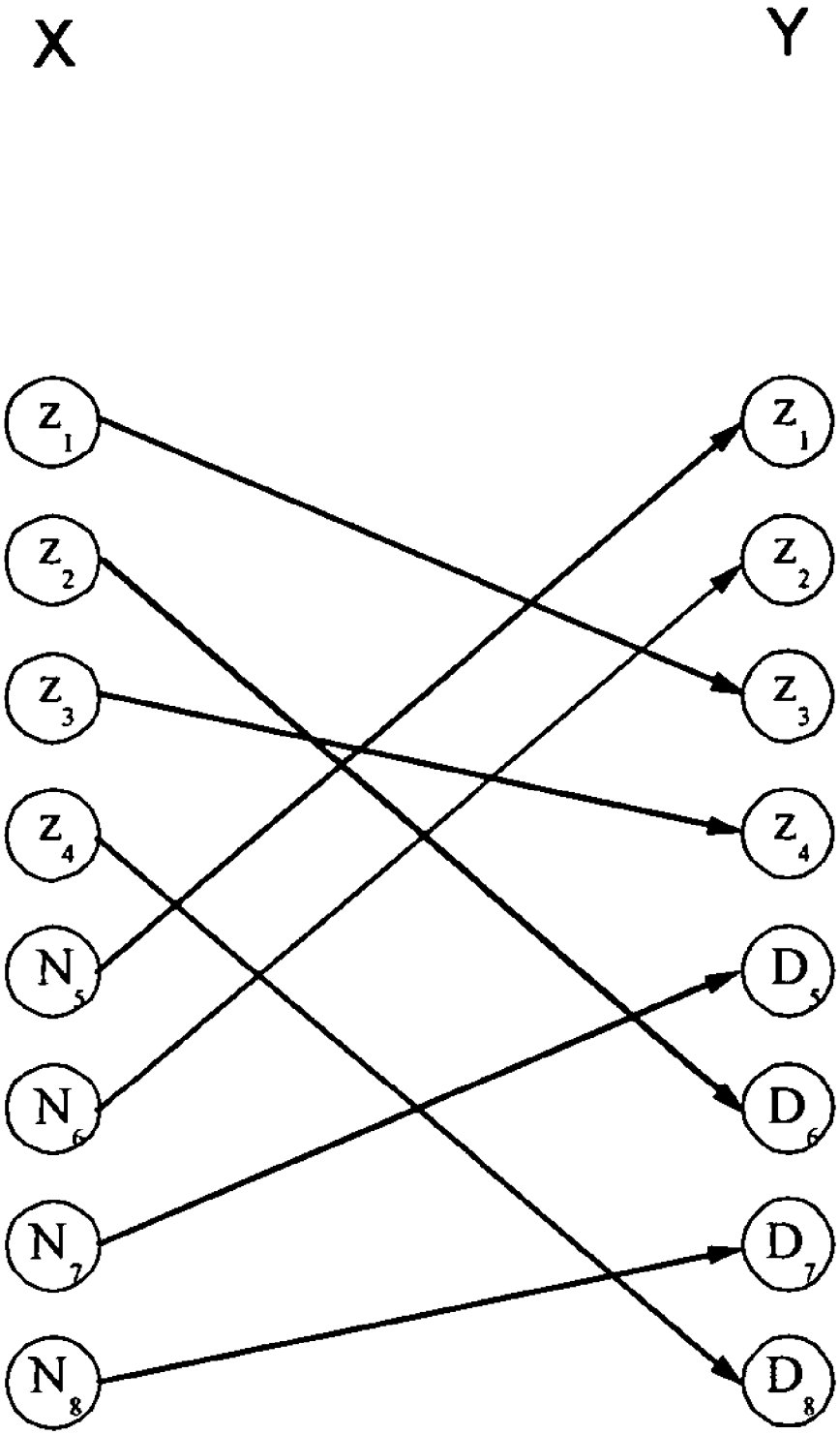
FIG. 6 is a schematic representation of an illustrative example of an bipartite graph for tracks of targets.

To represent track beginnings and ends, it is necessary to add another N vertices $\{N_i\}$ to X to represent track initiation ("new"), and another N vertices $\{D_i\}$ to Y to represent track termination ("disappeared"). The new vertices follow the $z_i$ in the bipartite graph, as shown in FIG. 6. FIG. 6 represents the following situation:

a track ($N_5$, $z_1$, $z_3$, $z_4$, $D_8$) that is initiated in location 1, transits locations 3 and 4, then terminates.

a singleton track ($N_6$, $z_2$, $D_6$) that is initiated in location 2, and terminates in location 2.

The edges $N_{i+N} \rightarrow z_i$ represent tracks which begin in location i, and the edges $Z_i \rightarrow D_{i+N}$ represent tracks which terminate in location i. The edges $N_i \rightarrow D_k$ represent nothing. A complete matching is always possible because:

the start of a track leaves an unmatched $D_i$ in Y.

the end of a track leaves an unmatched $N_k$ in X.

there is exactly one unmatched $N_k$ for each unmatched $D_i$.

Edges between all $N_k$ and $D_i$ are given low (negative) weights, so that they are never considered in favour of a legitimate (positively weighted) edge, and are only used to complete the maximum weight matching. The edge from $N_{i+N}$ to $z_i$ is given a weight proportionate to $^PN^{(i, t_i)}$ the likelihood that a new subject will appear at location i and time $t_i$. The edge from $z_i$ to $D_{i+N}$ is given a weight proportionate to $^PD^{(i, t_i)}$, the likelihood that an observed subject will disappear from location i at time $t_i$. The provision of tract initiation, N and track termination, D is particularly useful for the implementation of one embodiment of the method.

The fact that this embodiment of the method can find a maximum weighted partition of N observations in $O(N^3)$ steps, and can represent explicitly all the relevant a priori likelihoods, including the initiation and termination of tracks, is remarkable given Bell(N), the number of partitions of N observations. The method used differs from that described in Kettnaker in that track termination is represented explicitly, using a location-dependent likelihood, and so, the assignment problem formulation and graph structure are similar in spirit but different in detail.

In the implementation of this method, a maximum weighted matching was found using the Kuhn-Munkres algorithm. In this algorithm the vertices of a bipartite graph are given a feasible labelling, an equality subgraph is found, and the equality subgraph is extended using the augmenting path method, until it forms a complete matching.

Track Purity

One embodiment of the system described in this document is predicated on the belief that visual signatures can be created which are "well behaved" (see the section on Signature Generation & Classification) within the metric space of signatures and which can be clustered into non-intersecting sets, such that all the signatures generated by a specific individual, when observed across multiple cameras, fall within one set. Given this assumption, it is useful to know how many individuals are likely to be classified together because their signatures overlap in signature space. More prosaically, how many men in black suits and black sunglasses are transiting the system simultaneously?

Signature Uniqueness $S_U$ is the likelihood, $0 \leq S_U \leq 1$, that the signature associated with an individual is unique within a population of individuals being tracked. In a population of N individuals each characterised by an identical Su, each individual will share a signature with $N*(1-S_U)$ other individuals. To give a concrete example, if my signature uniqueness is 0.98, then in a population of 1000 people I would expect, on average, to find 20 people sufficiently alike that their signatures cannot be distinguished from mine. If the 1000 people were being tracked, then the 20 people with signatures like mine would produce observation events which would be clustered into the same primary track.

Although signatures may not be unique, individuals are, and if one possessed perfect knowledge about the identity of individuals in a set of observations, it would be possible to assemble perfectly correct tracks. Because signatures are not unique, any track one assembles will contain observations from several individuals sequenced together. Although the assembled track may not be an accurate representation of the movements of any one individual, it may contain subsequences of observations (length>1) which are subsequences from ideal correct tracks. The more correct subsequences (length>1) the track contains, the more "pure" it is. The Track Purity $T_{purity}$ is the percentage of observations in a track which correctly follow a preceding observation. A track which is 100% pure is a subsequence of a correct track. A track which is 0% pure contains no subsequences from a correct track.

Let us assume two successive observations associated with the same individual are separated by time T. If there is an uncorrelated background rate of observation events from other individuals possessing the same signature such that $\mu$ events occur within time T, then the probability P(k) that k observation events occur during time T is $$P(k) = \frac{e^{-\mu} \cdot u^k}{k!}$$

The probability that no other observation event occurs within time T is $e^{-\mu}$.

If there is a population of N individuals, each of whom produces an observation event every T seconds, then the rate at which observation events are generated is N/T. For any given signature there will be $N(1-S_U)$ individuals with that signature and there will be $N(1-S_U)/T$ events with the same signature, and in an interval of T seconds there will on average be $N(1-S_U)$ events.

The likelihood of an observation event correctly following another ($=T_{purity}/100$) is $$P(0) = e^{-N \cdot (1-S_U)}$$

In FIG. 7, the number N, of people is 500. Note the exponential dependency on the population of individuals with non-unique signatures clustered into the same primary track. Low levels of track purity reduce the effectiveness of the Transit Graph bootstrapping procedure described in the following section.

Transit Graph Refinement

If a system contains V cameras, then movements between cameras can be characterised by a Transit Graph with V vertices and at most $V^2$ edges. This in turn can be represented by a V×V matrix, where each entry represents the a priori knowledge about the relative frequency and duration of transitions from camera m to camera n, with $1 \leq m$, $n \leq V$.

The Transit Graph can be created using an off-line method. For example, a small group of individuals with a distinctive appearance and an independent method of recording location (cellphone, GPS recorder etc.) could be used to prime the Transit Graph with transit data. The difficulty with this method is that it is not responsive to actual traffic flows and actual transition durations. It would be more satisfying to have a method which did not depend on off-line knowledge, and which refined the Transit Graph continuously using observed traffic.

The difficulty is that in order to produce a Transit Graph, accurate track data is required. In order to refine accurate track data from observations, we need the a priori likelihood information contained in the Transit Graph. Starting with an uninitialised Transit Graph, and some observation events, it is not obvious that anything can be deduced, because there are many possible track hypotheses, and there is no a priori knowledge that would prefer one hypothesis over another. One of the contributions of the work described in this document is an iterative refinement algorithm that enables a Transit Graph to be initialised and deduced purely from observation events.

The reason that such an algorithm must exist can be deduced intuitively by considering the entropy of flows in the transit graph. For a collection of vertices V, a total traffic flow F has maximum entropy if the flow between any vertex and any other is $F/V^2$, where $V^2$ is the maximum number of possible edges. If an observation event E(n) is produced each time a unit of flow moves from vertex m, $1 \leq m \leq V$, to vertex n, and all events have identical signature, then the sequence of events, considered as a sequence of symbols, also has maximum entropy.

To see this, consider the observation event E(i) marking the movement of a unit of flow to vertex i. What event E(m) is most likely to follow this event?

Because of the symmetry of the graph and flows, we cannot prefer a particular flow event-any event E(m), $1 \leq m \leq V$, is equally likely. If we consider these flow observation events as a vocabulary of $V^2$ symbols, it is well-known that any sequence of these symbols will have maximum entropy when each symbol is equally likely. In other words, the fact that the flow in the graph has maximum entropy results in a sequence of events that, considered as an information source, also has maximum entropy.

The intuitive conclusion is that in a graph with low entropy flows, sufficient information must exist in the sequence of observation events to deduce something about the topology of the underlying network flow. If the flow F in an actual network is divided among E edges where $0 \leq E \leq V^2$ then each edge will receive a flow of F/E, and the ratio of the actual edge flow compared to the maximum entropy situation is $E/V^2$. If a network has 100 nodes, and each node has 8 edges connecting it to other edges, then this ratio is 800/10000, which is more than 1 to 10, a significant deviation from randomness, and the greater the number of vertices, the greater the deviation becomes.

Consider a network with V vertices and a population of N identical individuals where each individual causes observation events at a rate of m events/sec. Assume also that the network has E edges and that the flow is uniformly distributed among all the edges (ignoring any global flow problems that might arise). Consider an event e(i) that occurs when an individual is observed at location i. If this event is followed in the event stream by an event e(j), we might conclude that there is an edge between locations i and j, and update the Transit Graph entry TG(i,j) with information about this transition. In most cases, this deduction will be incorrect, because the event e(j) could be caused by any individual being observed at j, and not just the individual previously observed at i. In this case, the Transit Graph will contain some spurious information. On the other hand, if there is a genuine path from i to j, and the transition at j is caused by the same individual that caused the transition at i, then correct information will have been added to the Transit Graph.

It is useful to compare the quantity of correct information added to the Transit Graph compared to the quantity of incorrect information. When an event e(i) occurs, on average it will take 1/m seconds for the individual at i to cause another event e(j) at location j. During that time, (N·m)/m events could occur at any of the other vertices. The probability P(n=0) that no other event occurs, and the event e(j) will correctly follow e(i) is $$P(n=0) = e^{-N}$$

and the probability that some other uncorrelated event e(k), $1 \leq k \leq V$ occurs is $$P(n>0) = 1 - e^{-N}$$

During some time interval a total of M events occur, and each time this happens an entry in the Transit Graph is incremented. A total of $$M \cdot 1 - e^{-N}$$

events will be incorrectly assigned to any one of the $V^2$ entries in the transition graph matrix, so that each entry will receive $$\frac{M \cdot 1 - e^{-N}}{V^2}$$

counts. A total of $$M \cdot e^{-N}$$

events will be correctly assigned to one of the E entries in the Transition Graph matrix corresponding to an edge, so that each edge entry will receive a total of $$\frac{M \cdot e^{-N}}{E} + \frac{M \cdot 1 - e^{-N}}{V^2}$$

counts (which includes its share of the incorrect counts). The ratio incorrect counts in a non-edge entry to counts in an edge entry is $$1 + \frac{V^2 \cdot e^{-N}}{E \cdot (1 - e^{-N})}$$

For any finite value of N this ratio is greater than 1, as one might expect, as there is always a finite probability that correct information will be reported. For large, sparsely connected graphs we have $E \ll V^2$, and this suggests that it is possible to discern useful information in the Transit Graph for values of N that are "not too large". A measure of N can be found by ignoring the exponential term in the denominator and setting $$N = \ln\frac{V^2}{E}$$

If V=100 and each vertex has 4 edges, then N=3.2. If V=1000 then N 5.5. Recalling that N was given to be the number of identical individuals circulating through the graph, then a signature uniqueness value of 99% would give a total population of 320 for V=100 and 550 for V=1000.

The extreme sensitivity to the number of identical individuals means the goal of bootstrapping a Transit Graph in a single system observing a population of many tens of thousands is likely to be unachievable. The reasoning above is order-of-magnitude, but it indicates that there is a natural cell size of ~500 tracked individuals and ~100 cameras where it is possible to refine useful transit information from the raw stream of observation events, and this is verified by detailed simulation, details of which are given later.

Figure 9:
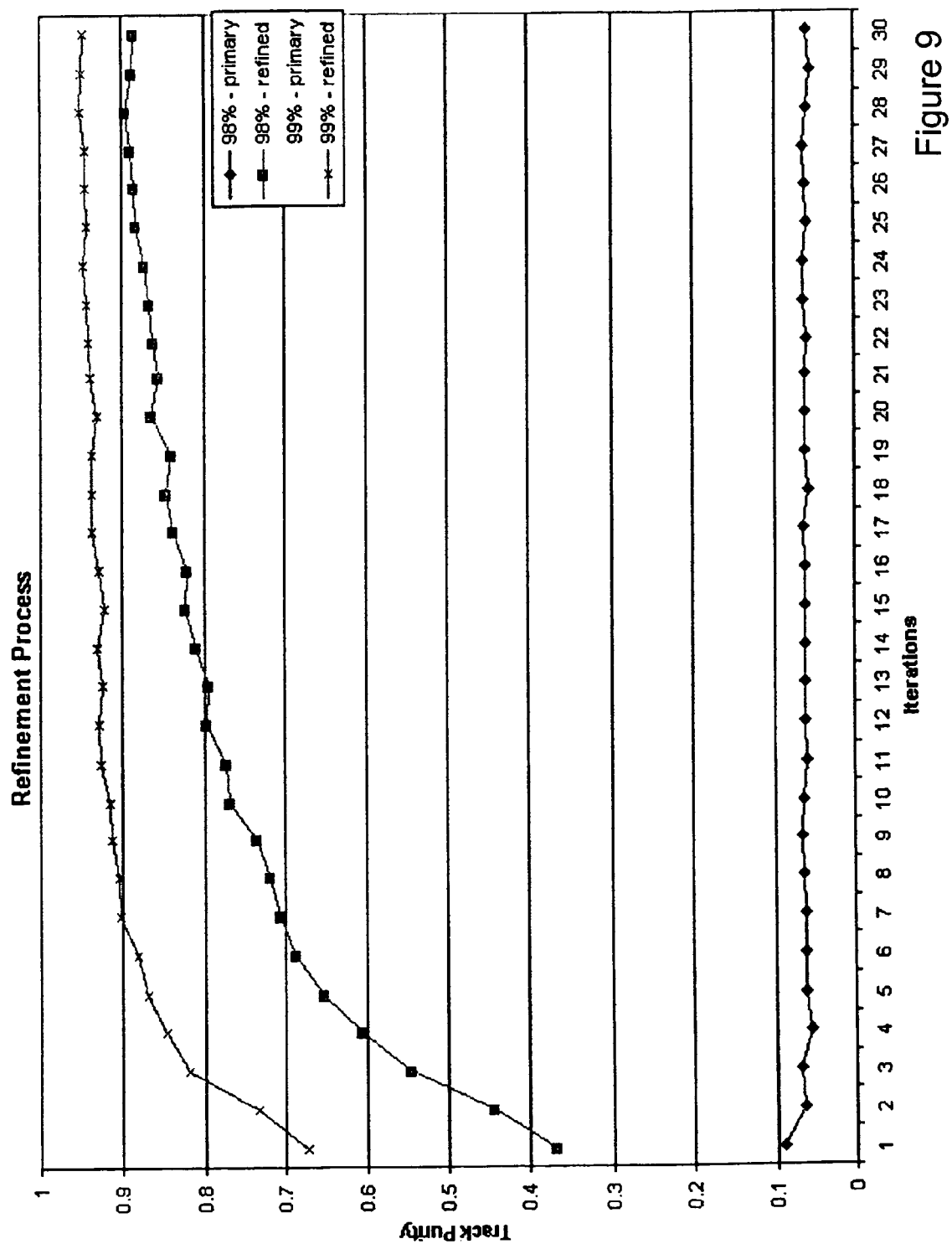
FIG. 9 is a graph showing the results of a simulation of the described method with track purity against number of iterations of the method.

The technique used is to weight each entry in the Transit Graph matrix TG(i,j) according to the number of times an observation event e(j) follows an event e(i), where each event falls into the same signature cluster. These weights are used for refining tracks using the weighted assignment algorithm. The refined tracks are then used to rebuild the Transit Graph. This process is repeated for many iterations. The quality of the Transit Graph information improves with each refinement, which in turn leads to better track purity for the refined tracks, which in turn yields a more accurate Transit Graph, as illustrated in FIG. 8. To see the result of applying this algorithm to a sequence of observations generated by a city simulation, refer to the Implemenation Section shown in FIG. 9.

The iteration process is repeated 30 times for a population of 1000 individuals with a signature uniqueness of 98% and 99%. When the signature uniqueness is 98%, the primary/unrefined track purity is about 6%, and the refined track purity begins at 36% and rises to 88%. When the signature uniqueness is 99%, the primary track purity is a higher 22%, and the refined track purity begins at 67% and rises to 95%.

This simulation demonstrates convincingly the extremely sensitive dependence on signature uniqueness, and also the relative ease with which it is possible to deduce a useful Transit Graph capable of refining tracks to high levels of purity from nothing more than very noisy input observations. The refinement process operates with no knowledge whatsoever of the camera graph topology (the graph is randomly rebuilt with each simulation).

Scaling Up

The system described has the unusual property that the tracking system is not initialised with prior information about the configuration of the cameras, or with data on location transit probabilities or transition times. This information is computed from low-quality observational data using a bootstrap process, and provides the system with resiliency against slowly changing traffic patterns. This property would appear to be essential in real world situations, where one is unlikely to be able to characterise real traffic flows with any degree of accuracy. It does have the limitation that the average observed population in transit must not be "too large" otherwise the purity of the primary tracks falls so low that the Transit Graph bootstrapping process fails to work. An approximate theoretical estimate (see the Transit Graph Refinement section above) concurs with simulation that this number is O(500) individuals—one cannot be precise because it depends critically on the distribution of signatures in signature space. There are methods that could increase this number, by pin-pointing high-quality primary tracks—these methods are described in the following section—but the overall conclusion remains the same. The Transit Graph bootstrapping process requires some limit on the number of similar individuals in the population, which limits the overall population.

A solution to this limitation is to group cameras into cells, so that each cell covers a connected spatial extent, and the spatial union of the cells covers the total observed region. Cameras on the boundary of a cell would have multiple membership, belonging to two or more cells. Individuals would be tracked within a cell, and if a track terminated on the boundary of a cell it could be associated with a track or tracks initiated within the adjacent cell.

Implementation

An implementation of a tracking system was built that conforms closely to the solution architecture previously described. A key aspect was the architectural separation between the camera/signature generation sub-system that generates observation event messages, and the subsystem that organises the observations into tracks, constructs a Transit Graph, and uses the Transit Graph to refine primary tracks into refined tracks.

A key motivation behind the implementation was to verify that it is feasible to construct a system capable of processing the outputs from hundreds of cameras observing thousands of people, and discover what level of success one might expect. A second motivation was to test the idea that it is possible to refine tracks using bootstrapped a priori knowledge without knowing anything about camera locations, transit times, and preferred routes—that is, to deduce the a priori knowledge needed to refine tracks, a process that to some extent undermines the notion of a priori knowledge. A third motivation was to search for heuristics that might improve the tracking process.

The camera/signature generation system was provided using a discrete-event (Monte Carlo) simulation of a population of observed individuals making journeys through a complex network of places. Three types of places were provided:
  domicile places.
  transit places.
  public places.

Each individual would begin in a domicile place, select a random public place as a destination, and negotiate a randomly generated mesh of transit places to the public place, then make a return journey to the same domicile place. This was repeated for the duration of the simulation. A percentage of the transit places would be designated observation points, and would generate an observation event message each time an individual entered that place. A typical simulation run would consist of
  500-1000 individuals
  100-400 transit places
  1000-2000 domicile place
  10-50 public places Typically, each home place would be connected to one transit place, each transit place would be randomly connected to 4-5 other transit places, and each public place would be connected to 2 transit places. The mesh of places would be generated randomly for each simulation. Larger numbers could be simulated, but the exponential dependency on the numbers of individuals in transit sharing the same signature classification (see the Transit Graph Refinement section) meant that an accurate Transit Graph could not be computed for larger simulations. Simulation confirms the approximate reasoning in the Transit Graph Refinement section, that there is a scale of a 100-1000 individuals and 100-200 transit nodes for which a Transit Graph capable of refining tracks can be computed from raw data. The only situations simulated were ones where the Transit Graph was deduced from the observational data; there was no method for initialising the tracking system with externally generated information about the mesh of transit places.

The only significant simplification made in the simulation was that individuals were pre-sorted into signature classes. If the signature uniqueness was set to 98%, then each individual would be randomly allocated to one of 50 signature classes, and all observations of that individual would be tagged with that signature. Each observation event message also contained the unique identity of each individual, so that the tracking subsystem could maintain a private set of "true tracks" which were used to assess the accuracy of refined tracks by computing the refined track purity with respect to the true track.

The tracking system uses knowledge about the average behaviour of a population to discriminate between what is a probable track and what is not. The journey time between two locations is particularly important; if the journey time between two locations is well defined, then transit time becomes a useful measure in deciding between track hypotheses. The more variation there is in the transit times, the less useful transit time becomes as a discriminator, an instance of the general rule that the noisier the data is, the harder it is to extract anything useful from it.

Each transit place in the mesh of places has a mean residency time defined, with the mean selected from a Gaussian distribution. The residency time for each individual is selected at each simulation step from a Gaussian distribution using the mean for the place, and a standard deviation that is a fixed proportion of the mean. Simulation confirms what is intuitively obvious: the larger the standard deviation, the less successful tracking is.

Figure 10:
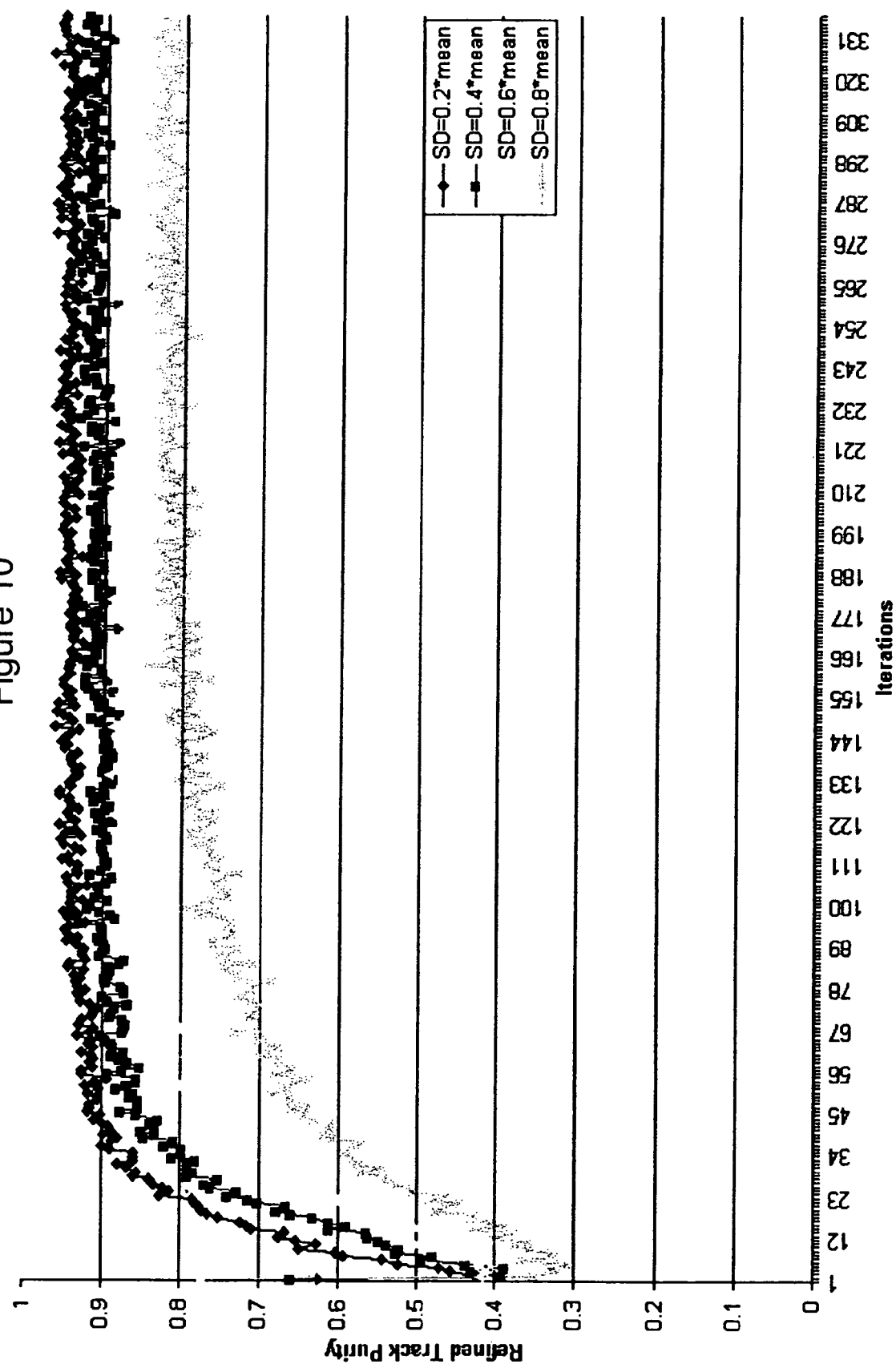
FIG. 10 shows track purity against number of iterations for a simulation of the method described.

FIG. 10 shows the refined track purity plotted against the number of refinement interactions for the standard deviation equal to 0.2, 0.4, 0.6, and 0.8 of the mean transit time. The population is 1000 individuals, signature uniqueness is 98%, and there are 100 transit nodes. The refined track purity asymptotes to 95-96% when the standard deviation is 0.2 of the mean, and asymptotes to 80-83% when the standard deviation is 0.8 of the mean. Transit times between any two locations in the Transit Graph are stored in the form of a rolling mean of size K; that is, the last K transit times are stored in the form of a first-in-last-out queue and used to compute the mean and standard deviation. In a non-steady state, the rolling mean is a method used to estimate statistical parameters, but also to slowly forget old data. For most of the simulations K=50.

The tracking system was written in C++ for speed. The core of the tracker is an implementation of the Kuhn-Munkres bipartite graph weighted assignment algorithm written by the author. Because of the $O(N^3)$ behaviour of this algorithm, primary tracks were batch refined when the average primary track length consisted of about 50-70 observations. When the signature uniqueness was 98%, there would be 50 primary tracks, making about 2500-3500 observations in each batch. These would be refined and a 10,000 vertex Transit Graph rebuilt in about 4 seconds of real time on an 800 MHz Pentium running Windows 2000. From this, one can deduce that even in its current state an observation event rate of 900 events/second can be handled by the tracker; this number is high enough that the event communication load is likely to be more of an issue than the speed of the tracking system.

The system is compute-bound and highly parallelisable. The speed is dominated by the weighted assignment algorithm, and each primary track can be refined in parallel, so a linear speed-up proportional to the number of primary tracks is trivial to achieve. In the example above, a speed of 45,000 events/second could be achieved using a computer array of 50 processors. The assignment algorithm itself can also be parallelised.

The most useful heuristic discovered is to use primary tracks of high purity to refine the Transit Graph. The most obvious way is to only update the graph during periods of light traffic, as primary track purity is a direct function of the number of individuals under observation sharing the same signature classification.

A second method is to calculate the mean track length over all primary tracks, and only update the Transit Graph with tracks whose length is less than the mean. The reasoning behind this is that short primary tracks are more likely to have been generated by a smaller number of individuals in the same signature classification, and by implication the track purity for those tracks is likely to be higher. A third method is to tag primary tracks with information from the signature classifier, indicating whether the track corresponds to a signature in an infrequently populated part of signature space. Again, this track is more likely to be of higher purity. A fourth method is to use the number of refined track hypotheses for a primary track as a guide to its quality. A primary track that refines into many tracks is likely to have a lower purity than one that refines to a single track. Clearly these four methods can be combined in an heuristic to suggest which refined tracks are of high quality, and are suitable for updating the Transit Graph.

The tracking system described in the Tracking Section requires signatures capable of classification. This means that when the signatures generated by the same individual are plotted in an appropriate high-dimensional space, then all the signatures should be 'close' according to some measure. It would be impossible to carry out meaningful classification if two signatures generated from viewpoints that differed only by a few degrees and were perceptually similar appeared in very 'distant' parts of the space.

From this, it is clear that we need to be able to map signatures into a metric space in such a way that views of a subject that are perceptually similar produce signatures that are close according to the distance measure in the metric space. Given that subjects can be viewed through a full 360 degrees, this is a strong design constraint on the way a signature is specified and coded in a compact form.

In addition to this constraint on the method for generating visual signatures, the tracking system described in this document depends on being able to generate a visual signature for each person within the field of view of a camera. This must take place reliably in the face of:

many individuals being within the field of view.
occlusion of some individuals by others.
occlusion of individuals by fixed foreground objects such as pillars, waste bins etc.
occlusion of individuals by moving foreground objects such as shopping trolleys, vehicles, pushchairs etc.
changes in light intensity.
shadows.
variation in cameras and light sources.
distance, orientation, stance, gait and speed.

It will now be outlined what appears to be a promising approach at this time, based on the techniques of colour image segmentation and colour indexing. Colour indexing is one of the most important techniques in Content Based Image Retrieval. Its importance derives from the fact that objects can be distinguished/retrieved by using colour information alone, and colour feature extraction is relatively invariant to scale and orientation in a way that geometric features are not. It can also be carried out at real-time video frame rates.

A basic and popular technique is colour histogramming. The colour space (e.g. RGB, or hue/saturation) is partitioned into buckets, and the number of pixels falling into each bucket is recorded and used as the basis for a colour signature. There is an issue of how to normalise the histogram for scale invariance. Another popular method is to fit the colour of the object to a parametric model such as a mixture of Gaussians; the parameters can then be used as a compact signature.

In both cases, colour constancy must be considered. The light reflected from an object is dependent on the spectrum of the illuminating light, which in turn is composed of direct light and reflected light from the environment. The apparent colour of a given material can be very different depending on the colour temperature of the main light source. Despite the apparent differences due to racial type, the colour of human skin is well defined in 2D hue/saturation space, but varies markedly according to the colour temperature of the light source.

There is also the effect of uneven illumination, so that a single colour may appear differently in different parts of an image. There are techniques for normalising the colour information in an image, but in general, one would expect that a given camera would have to be calibrated with respect to available light sources.

Real-time tracking of people using colour image segmentation has been reported by many authors. No tracking system capable of generating a signature based on colour information has been identified that meets all the requirements described in this section, and there is an opportunity for work in this area. The kinds of cameras typically used in today's surveillance applications are inadequate for the application described in this paper. An ideal approach combines visual imaging with embedded processing for feature extraction in a compact, and (ultimately) low cost format. It is highly probably that binocular imaging would be used, as it is very effective in separating multiple foreground objects from a background, and provides distance information for image scaling.

Related Work

There is a large literature on using cameras to track human body parts and the human body, normally in a spatially limited environment. Although there is some literature on tracking individuals across cameras, this is normally with overlapping fields of view, or a small number of observed subjects. There is a considerable literature on tracking large numbers of targets using a variety of sensor types with various military and air-traffic control applications, but these have not considered cameras in an urban setting.

The most relevant work which combines these approaches is described in Kettnaker's thesis and accompanying paper with Zabih. It is limited in considering only a small number of cameras (4), a limited spatial environment (a building), and there is no architectural extension to large scale systems as proposed here. Transit likelihoods are measured by hand, and there is no process for generating and maintaining a Transit Graph.

Privacy Concerns

The primary utility of the system and method described above is likely to be the retrospective analysis of critical events. It is now routine for police to use video evidence from a crime scene to attempt to reconstruct the movements of people in the vicinity. It can often take weeks to do this, by which time the opportunity to contact key witnesses may be lost. If the tracking system described is linked to a video repository, then it becomes straightforward to trace the movements of individuals, and the fact that tracking is less than 100% effective is inconsequential—the system is always going to be vastly faster than trying to solve the combinatorics manually.

If one embodiment of the system is used for retrospective analysis, then privacy safeguards are straightforward to apply. Access could be controlled by warrant following application to a court in the same way that search and wiretapping warrants are currently issued. The retrieval warrant would define who could access what data, and further restrict the available records by date, time and place. The warrant would, be produced in a digitally encoded form and added to a warrant database. This warrant database would perform the role of the Authentication Server as defined in the Kerberos Authentication Service e.g., based on a public-key client-server authentication protocol. This is sufficient to safeguard tracking records and video repository records from unauthorised access.

CONCLUSIONS

Embodiments of a system have been described that would make it possible to track the movements of a large population of individuals over a spatially extended region, such as a town centre, an airport terminal, or a metro system. It uses cameras as visual sensors to identify key features of an individual (a visual signature) and uses tracking algorithms to find the most probable tracks using knowledge of underlying traffic flows. One part of the algorithm is unusual in that it bootstraps knowledge of the background traffic flows from poor quality observational data, increasingly refining the quality of the observational data in parallel with the traffic flow patterns.

The tracking system has proved itself to be extremely robust and convergent; given observational data that is 1%-10% correct, it can refine that data to 90-95% correctness in the absence of any information about the network of visual sensors.

One embodiment of the system can easily handle real-time workloads, and the system can scale to practical levels. The most immediate application for such a system would be retrospective analysis of crime scenes in public places, and it would be straightforward to add legal safeguards to such a system to prevent misuse and satisfy privacy concerns.

This section provides expanded technical detail of an element of the one embodiment described above. Below is described a method and apparatus for the parallel refinement of tracks.

Figure 11:
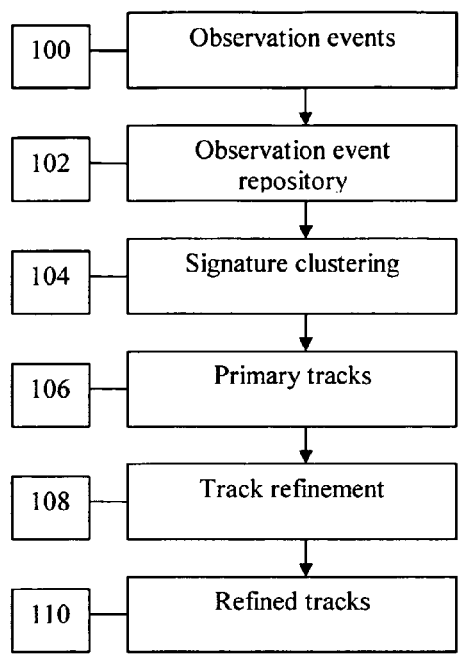
FIG. 11 is a flow chart of the steps in producing primary tracks and refining the tracks.

An outline of the tracking process described above is shown in FIG. 11:

1. Observation events 100 are recorded in an Observation Event Repository 102.
2. A batch of events 100 is selected according to a time window and the signatures are clustered 104. All events, in a cluster are taken as having an identical signature, and the corresponding events are temporally ordered into a primary track 106.
3. Primary tracks are refined at 108 using Transit Graph probabilities.

4. Refined tracks 110 are delivered as output. Each primary track could be refined into many refined tracks.
5. (Optional): refined tracks are used to update the Transit Graph.

The tracking process is computationally expensive. The most expensive parts of the process are signature clustering, and primary track refinement. In signature clustering, signatures are represented in a high-dimensional space, and their mutual proximity becomes the basis for creating a set of clusters in this space, the premise being that signatures within a cluster cannot be further disambiguated on the basis of information contained solely within the signature.

The number of primary tracks is the same as the number of clusters found by the clustering process. The number of clusters found will depend on how well the signature generation process can disambiguate similar-looking people, while being resilient to simple changes such as viewing angle, orientation, illumination, camera variation etc. In general, there will be a trade-off: signatures that are too specific to one observation of one person will result in observations of the same person being scattered over a significant region of signature space in a diffuse cluster which may overlap other clusters. A signature generation process that is robust and produces compact clusters is unlikely to discriminate well, and may confuse people with a similar appearance. The optimum point will need to be discovered by trial and error, but logic suggests that there are likely to be O(50) clusters.

Suppose, there are E event observations, and N clusters (=N primary tracks). The length of each primary track is E/N, and the computational complexity of the refinement process grows as $O((E/N^3)$. To put this in perspective, 10000 events grouped into 50 clusters will take 1000 times as long to refine as 1000 events grouped into 50 clusters.

One ambition of this work is to track very large numbers ($10^5$-$10^6$) of people. It should be clear that the steep increase in computation time required as the number of tracked individuals increases means that such a system will invariably be limited by the quantity of computation available.

It has been recognized that there is a computational bottleneck caused by track refinement, that primary tracks can be refined in parallel, and that there are particular schemes for parallelizing such tasks (known to practitioners of the art) which are effective and appropriate.

The following section contains a description of what might be considered a typical embodiment. The following embodiment uses a message passing mode for task distribution. Note that an equivalent distributed shared memory model is also possible. Both of these underlying methods are well known to those skilled in the art.

A track refinement coordinator process 120 takes each primary track, consisting of a temporally-ordered sequence of observation events, and packages it into a refinement work package. This packaging consists of marshalling the data into a form suitable for transmission to another computer system in the form of a message.

A pool of track refinement worker processes 122a-d request new refinement tasks from the coordinator process 120. If no refinement task is available, the worker task waits (suspends itself pending some work). When a refinement task is available, the coordinator process 120 sends a message containing the refinement work package to the worker process 122a-d, and the worker process uses the weighted bipartite graph algorithm as described above to refine the primary track into one or more refined tracks (at 124 in FIG. 12). The worker process packages the refined track data for transmission and returns the result to the coordinator process.

Figure 12:
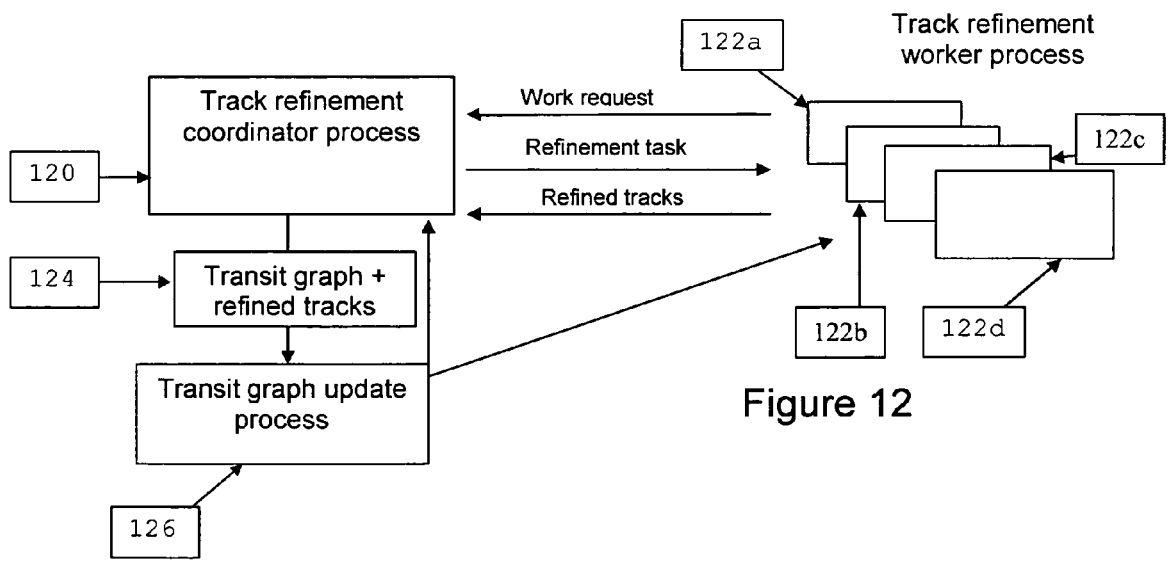
FIG. 12 is schematic flow diagram of an embodiment of a method of refining the tracks in parallel.

An optional action is for the coordinator process to use the refined track data to update its version of the Transit Graph (at 126 in FIG. 12). Another worker process could be used to carry out this update asynchronously, replacing the master copy of the Transit Graph when the update is complete. As the track refinement worker process require a copy of the Transit Graph, new copies need to be disseminated periodically by message passing. This embodiment for this approach is illustrated in FIG. 12.

A further addition to this embodiment comes from the observation that there are several algorithms for the weighted matching problem, and some are suitable for parallel execution on a suitable multiprocessor system. Each worker process (122a-d) would be hosted by multiprocessor system and the maximum weighted matching for each primary track could be found using processor threads (or equivalent) operating in parallel.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A method of refining a plurality of primary tracks of a plurality of targets, the method comprising:
   receiving a plurality of primary tracks, including:
      partitioning target observations according to similarities in visual signatures of the target observations to form the plurality of primary tracks so that each primary track in the plurality of primary tracks includes ordered sequences of observation events having similarities in their visual signatures;
   dividing the primary tracks into separate refinement packages;
   allocating the refinement packages to different ones of a plurality of processors; and
   receiving one or more refined tracks from the plurality of processors.

2. A method as claimed in claim 1, in which the different processors are different computing devices, different processors in a single computing device, or different elements of single computer processor.

3. A method as claimed in claim 1, in which a track refinement coordinator process receives the plurality of primary tracks and divides the primary tracks into the separate refinement packages.

4. A method as claimed in claim 1, in which the visual signature comprises a finite bit string that characterizes a target.

5. A method as claimed in claim 1, in which the refinement by the processors uses a transit graph.

6. Apparatus for refining a plurality of primary tracks of a plurality of targets, the apparatus comprising:
   track refinement coordinator process means operable to receive a plurality of primary track data, wherein the primary track data includes target observations partitioned according to similarities in visual signatures of the target observations to form the plurality of primary tracks so that each primary track in the plurality of primary tracks includes ordered sequences of observation events having similarities in their visual signatures; and
   a plurality of track refinement worker process means operable to perform a track refinement process, wherein the plurality of track refinement worker process means operable to work in parallel to refine a plurality of primary tracks substantially simultaneously.

7. Apparatus for refining a plurality of primary tracks of a plurality of targets, the apparatus comprising:
   track refinement coordinator process means operable to receive a plurality of primary track data, wherein the primary track data includes ordered sequences of observation events having similarities in their visual signatures; and
   a plurality of track refinement worker process means operable to perform a track refinement process, wherein the plurality of track refinement worker process means operable to work in parallel to refine a plurality of primary tracks substantially simultaneously;
   wherein the track refinement coordinator process means are operable to update a transit graph used by the plurality of track refinement worker process means.

8. Apparatus for refining a plurality of primary tracks of a plurality of targets, the apparatus comprising:
   track refinement coordinator process means operable to receive a plurality of primary track data, wherein the primary track data includes ordered sequences of observation events having similarities in their visual signatures; and
   a plurality of track refinement worker process means operable to perform a track refinement process, wherein the plurality of track refinement worker process means operable to work in parallel to refine a plurality of primary tracks substantially simultaneously;
   wherein the transit graph represents a likelihood of a target moving between two specified locations.

9. Apparatus as claimed in claim 8, wherein the transit graph is updated with information from subsequent target observations.

10. Apparatus as claimed in claim 8, wherein the two specified locations are locations of image capture devices.

* * * * *